United States Patent
Kim et al.

(10) Patent No.: US 8,916,119 B2
(45) Date of Patent: Dec. 23, 2014

(54) SYSTEM USING SELECTIVE CATALYTIC REDUCTION FOR IMPROVING LOW-TEMPERATURE DE-NOX EFFICIENCY AND REDUCING YELLOW PLUME

(75) Inventors: Dae Woo Kim, Incheon (KR); Ha Kue Park, Daejeon (KR); Jae Pil Jung, Anyang-si (KR)

(73) Assignee: GEESCO Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/884,554

(22) PCT Filed: Oct. 20, 2011

(86) PCT No.: PCT/KR2011/007818
§ 371 (c)(1),
(2), (4) Date: Sep. 18, 2013

(87) PCT Pub. No.: WO2012/064025
PCT Pub. Date: May 18, 2012

(65) Prior Publication Data
US 2014/0010748 A1 Jan. 9, 2014

(30) Foreign Application Priority Data
Nov. 9, 2010 (KR) .................. 10-2010-0110770

(51) Int. Cl.
*B01D 53/56* (2006.01)
*B01D 53/86* (2006.01)
*F23J 15/00* (2006.01)

(52) U.S. Cl.
CPC ...... *B01D 53/565* (2013.01); *B01D 2258/0241* (2013.01); *B01D 53/8625* (2013.01); *F23J 2219/10* (2013.01); *B01D 2251/2062* (2013.01); *B01D 2251/208* (2013.01); *F23J 15/003* (2013.01); *B01D 2258/012* (2013.01); *F23J 2215/10* (2013.01)
USPC ........................................................ 423/239.1

(58) Field of Classification Search
CPC .............................. B01D 53/56; B01D 53/565
USPC ........................................................ 423/239.1
See application file for complete search history.

(56) References Cited

U.S. PATENT DOCUMENTS

| 7,264,785 B2 | 9/2007 | Blackeman et al. | |
| 8,234,865 B2 * | 8/2012 | Andrews | 60/602 |
| 2009/0297417 A1 | 12/2009 | Sun et al. | |

FOREIGN PATENT DOCUMENTS

KR    10-0439004 B1    7/2004

OTHER PUBLICATIONS

Lee, et al., "Characteristics of Low Temperature De-NOx Process with Non-Thermal Plasma and $NH_3$ Selective Catalytic Reduction (II)" J. Korean Ind. Eng. Chem., vol. 17(4): 414-419 (Aug. 4, 2006).

*Primary Examiner* — Timothy Vanoy
(74) *Attorney, Agent, or Firm* — Morgan, Lewis & Bockius LLP; Jeffry S. Mann

(57) ABSTRACT

The present disclosure relates to a method for removing nitrogen oxides ($NO_x$) more effectively at 300° C. or below in boilers, gas turbines, incinerators, diesel engines, glass melting furnaces, etc. by selective catalytic reduction (SCR). To this end, an oxidation catalyst is mounted in front of a $NO_x$-reducing device based on selective catalytic reduction and the $NO_x$ composition, i.e. the ratio of $NO:NO_2$, in the exhaust gas is adjusted to about 1:1, such that de-$NO_x$ catalytic reaction is carried out under optimized fast SCR condition and de-$NO_x$ efficiency at low temperature can be maximized.

5 Claims, 11 Drawing Sheets

SYSTEM USING SELECTIVE CATALYTIC REDUCTION FOR IMPROVING LOW-TEMPERATURE DE-NOX EFFICIENCY AND REDUCING YELLOW PLUME

TECHNICAL FIELD

The present disclosure relates to a method for removing nitrogen oxides ($NO_x$) more effectively at 300° C. or below by adjusting the composition of the exhaust gas from boilers, gas turbines, incinerators, diesel engines, glass melting furnaces, etc. to be optimized for fast selective catalytic reduction (SCR).

BACKGROUND ART

Nitrogen oxides ($NO_x$) emitted from power station boilers, gas turbines, industrial boilers, incinerators, diesel engines, or the like are a major cause of pollution.

$NO_x$ is an important air pollutant produced during combustion of fuels. Although the term includes all nitrogen oxides such as $N_2O$, $NO$, $N_2O_3$, $NO_2$, $N_2O_5$, $NO_3$, etc., it is used in the present disclosure to refer to $NO$ and $NO_2$, which are the main cause of air pollution.

Methods for inhibiting or reducing $NO_x$ production include low excess air firing, combustion zone cooling, combustion air preheating control, combustion device changing, staged combustion, water vapor spray combustion (emulsion combustion), exhaust gas recirculation, fuel conversion and fluidized bed combustion.

Recently, selective non-catalytic reduction or selective catalytic reduction (SCR) is frequently employed for post-treatment of $NO_x$. In selective catalytic reduction, ammonia or urea is sprayed in front of a de-$NO_x$ catalyst, such that nitrogen oxide included in the exhaust gas is converted to unharmful water and nitrogen as it passes through the ammonia and the catalyst as follows.

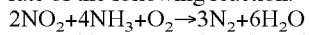

This reaction is called standard SCR and is known to exhibit the highest reaction efficiency when the reaction temperature is approximately 300-400° C.

However, as recovery of energy from the exhaust gas from boilers, incinerators or diesel engines is maximized recently, the temperature of the exhaust gas is often below 300° C. Also, incinerators are often operated at 200° C. or below to reduce fuel cost.

As for biomass power plants or glass melting furnaces, a catalyst is disposed in the rear of an electric dust collector or a bag filter to prevent poisoning of the catalyst by Na ions included in the exhaust gas and the catalyst operation temperature is reduced to 200° C. or below.

If the temperature of the exhaust gas is low, the amount of the de-$NO_x$ catalyst has to be increased or the efficiency of the de-$NO_x$ catalyst has to be improved. However, to increase the amount of the de-$NO_x$ catalyst requires additional cost since operation of a blower is necessary because of poor combustion status owing to increased reactor volume and pressure drop. And, to improve the efficiency of the de-$NO_x$ catalyst at low temperature is technically very difficult and requires a lot of cost.

Meanwhile, combined cycle power plants produce yellow plume during startup of gas turbines because a large quantity of $NO_2$ is emitted. However, removal using a catalyst is not easy because of low temperature of the exhaust gas and slow rate of the following reaction.

$$2NO_2+4NH_3+O_2 \rightarrow 3N_2+6H_2O$$

For this reason, ethanol or other substance is sprayed at the outlet of the gas turbine to remove the yellow plume by removing $NO_2$. However, this method is problematic in that carcinogenic formaldehyde is produced, operation cost increases due to the expensive ethanol and a selective catalytic reduction (SCR) process has to be added since NO, which is produced during normal operation of the gas turbine, is not removed According to recent studies, it is reported that fast SCR, in which the de-$NO_x$ efficiency is the highest at 300° C. or below when the composition of the exhaust gas is $NO/NO_2=1$, is suitable to increase the de-$NO_x$ efficiency. The associated reaction is as follows.

In the fast SCR, it is known that the de-$NO_x$ efficiency is the highest at 300° C. or below when the composition of the exhaust gas is $NO:NO_2=1:1$ and the efficiency is up to 10 times that of standard SCR at lower temperatures.

To apply the fast SCR to the actual facilities, the composition of the exhaust gas has to be adjusted to $NO/NO_2=1$ before passing through the de-$NO_x$ catalyst.

Since the exhaust gas contains 90% or more NO during normal operation of the boiler, in general, a non-thermal plasma or ozone generator may be used to oxidize NO included in the exhaust gas at 150-200° C., as shown in FIG. 1, so as to convert the NO in the exhaust gas to $NO_2$ and induce the fast SCR reaction.

Although the non-thermal plasma or ozone generator is very useful in that it can be used at low temperature and the degree of NO oxidation can be easily controlled electrically, it is less economical as compared to heating of the exhaust gas to the optimum temperature necessary to achieve the desired reaction efficiency using, for example, a duct burner, at present.

Although cost increase can be avoided if an oxidation catalyst is used to oxidize NO instead of the non-thermal plasma or ozone generator, the performance of the oxidation catalyst is very low at 150-200° C. where the fast SCR reaction occurs effectively. Accordingly, the oxidation catalyst cannot be disposed at the location shown in FIG. 1. In addition, since the oxidation catalyst has to be installed in a fixed manner, the degree of NO oxidation cannot be controlled as desired unlike the non-thermal plasma or ozone generator.

REFERENCES OF THE RELATED ART (Non-patent document 1) [Reference 1] Cristian Ciardelli, Isabella Nova, Enrico Tronconi, Daniel Chatterjee, Brigitte Bandl-Konrad, Michel Weibel, Bernd Krutzsch, Reactivity of $NO/NO_2$—$NH_3$ SCR system for diesel exhaust aftertreatment: Identification of the reaction network as a function of temperature and $NO_2$ feed content, *Applied Catalysis B: Environmental* 70, 2007, 80-90.

(Non-patent document 2) [Reference 2] Jae-Ok Lee, Young-Hoon Song, Characteristics of Low Temperature De-$NO_x$ Process with Non-thermal Plasma and $NH_3$ Selective Catalytic Reaction (I), *J. Korean Ind Eng. Chem, Vol.* 17, No. 4, August 2006, pp. 409-413.

(Non-patent document 3) [Reference 3] Jae-Ok Lee, Young-Hoon Song, Characteristics of Low Temperature De-$NO_x$ Process with Non-thermal Plasma and $NH_3$ Selective Catalytic Reaction (II), *J. Korean Ind Eng. Chem, Vol.* 17, No. 4, August 2006, pp. 414-419.

(Non-patent document 4) [Reference 4] Young-Hoon Song, Jae-Ok Lee, Min-Suk Cha, Seock-Joon Kim, Jeong-In Ryu, A Study on a Combined De-$NO_x$ Process of Plasma Oxidation and $NH_3$ SCR for Diesel Engine, *J. Korean Soc. Combust., Vol.* 12, No. 4, pp. 39-46, 2007.

DISCLOSURE

Technical Problem

The present disclosure is directed to greatly improving de-$NO_x$ performance of an oxidation catalyst at low temperature and effectively removing yellow plume during startup of a gas turbine for application of the currently studied fast selective catalytic reduction (SCR).

Technical Solution

In order to maximize the efficiency of a de-$NO_x$ catalyst based on fast selective catalytic reduction (SCR), the inventors of the present disclosure have developed a system wherein the composition of an exhaust gas is adjusted to $NO_2/NO_x = \sim 0.5$ using an oxidation catalyst before passing through a de-$NO_x$ catalyst.

Since the oxidation efficiency of the oxidation catalyst is greatly decreased at 150-200° C. where the fast SCR occurs effectively, it has to be disposed as shown in FIG. 2 so that reaction can occur at 300° C. or above. In order to solve the problem of difficult control of degree of NO oxidation, the oxidation catalyst is installed by combining a fixed oxidation catalyst and a moveable oxidation catalyst as shown in FIG. 3. The ratio of $NO:NO_2$ can be easily controlled by varying the location of the oxidation catalyst.

In case of a glass melting furnace or a biomass boiler, since SCR is provided in the rear of a dust collector because the concentration of Na ions or dust in the exhaust gas is high, the oxidation catalyst may be disposed in front of a heat exchanger as shown in FIG. 4, so that fast SCR can occur in the rear of the dust collector after the composition of the exhaust gas is adjusted. In order to solve the problem of difficult control of degree of NO oxidation, the oxidation catalyst of FIG. 4 may be installed as in FIG. 5 so that the ratio of $NO:NO_2$ can be easily adjusted by controlling the flow volume of the exhaust gas.

In case of combined cycle power generation, a recently built facility does not require fast SCR since the catalyst is disposed in a zone where the temperature is 300° C. or higher. However, the conventional facility wherein the catalyst is disposed in a space for maintenance of a heat recovery steam generator (HRSG), the catalyst operation temperature is often 250° C. or below. In this case, fast SCR is necessary to reduce the required amount of the catalyst.

Since it is easy to ensure an optimum temperature zone of the oxidation catalyst in combined cycle power generation, fast SCR may be induced by installing the oxidation catalyst in the high-temperature zone in the rear of a gas turbine inside the heat recovery steam generator, as shown in FIG. 6. The degree of NO oxidation can be controlled by installing the oxidation catalyst by combining a fixed oxidation catalyst and a moveable oxidation catalyst as shown in FIG. 3.

The temperature of the exhaust gas and $NO_2$ concentration during startup in combined cycle power generation are as shown in FIG. 7. During the early stage of startup, yellow plume is produced because of high $NO_2$ concentration and low exhaust gas temperature, which is not removed easily because the SCR reaction proceeds slowly.

In some combined cycle power plants, a duct burner is equipped in the rear of the gas turbine as shown in FIG. 8 to raise the temperature of the exhaust gas at the inlet of the heat recovery steam generator. In this case, the yellow plume produced during startup can be easily removed by raising the temperature of the exhaust gas.

However, in most combined cycle power plants where the duct burner is not installed, to install and operate a duct burner to remove the yellow plume is not economically feasible. In that case, as shown in FIG. 9, the de-$NO_x$ catalyst is disposed in two stages and a reducing agent such as $C_3H_6$ is sprayed in front of the first-stage catalyst to reduce an adequate amount of $NO_2$ to NO. The spraying amount of the $C_3H_6$ reducing agent is adjusted such that the ratio of $NO:NO_2$ in the rear of the first-stage catalyst is 1:1. And, a reducing agent such as ammonia is sprayed in front of the second-stage catalyst so as to induce fast SCR and thereby remove not only the nitrogen oxide included in the exhaust gas but also the yellow plume produced during startup of the gas turbine. After the operation of the gas turbine is stabilized, the spraying of the hydrocarbon reducing agent in front of the first-stage catalyst is stopped and a reducing agent such as ammonia is sprayed.

Advantageous Effects

In accordance with the present disclosure, effective removal of $NO_x$ from exhaust gas is possible even at low temperature without increasing the amount of catalyst by providing an existing selective catalytic reduction (SCR) facility with an oxidation catalyst or an ozone generator. Accordingly, operation cost and catalytic reactor volume can be greatly reduced.

If the method of the present disclosure is applied to an incinerator or a glass melting furnace, SCR reaction temperature in the rear of a bag filter can be minimized and thus auxiliary fuel cost can be greatly reduced.

Furthermore, yellow plume produced during startup of a combined cycle power plant can be easily removed using the existing SCR facility.

DETAILED DESCRIPTION OF MAIN ELEMENTS

1: flow of exhaust gas, 2: economizer, 3: flow of exhaust gas in duct, 4: non-thermal plasma or ozone generator, 5: ammonia reducing agent sprayer, 6: exhaust gas guide vane, 7: soot blower, 8: de-$NO_x$ catalyst, 9: oxidation catalyst (9-a: fixed oxidation catalyst, 9-b: moveable oxidation catalyst), 10: boiler, 11: NO oxidation controller, 12: heat exchanger, 13: dust collector or bag filter, 14: SCR, 15: stack, 16: damper, 17: gas turbine, 18: bypass stack, 19: superheater of heat recovery steam generator, 20: reheater of heat recovery steam generator, 21: main stack, 22: first-stage catalyst reducing agent sprayer, 23: first-stage de-$NO_x$ catalyst. 24: second-stage catalyst reducing agent sprayer, 25: second-stage de-$NO_x$ catalyst

BEST MODE

Hereinafter, the embodiments of the present disclosure will be described in detail with reference to accompanying drawings.

Figure 1:
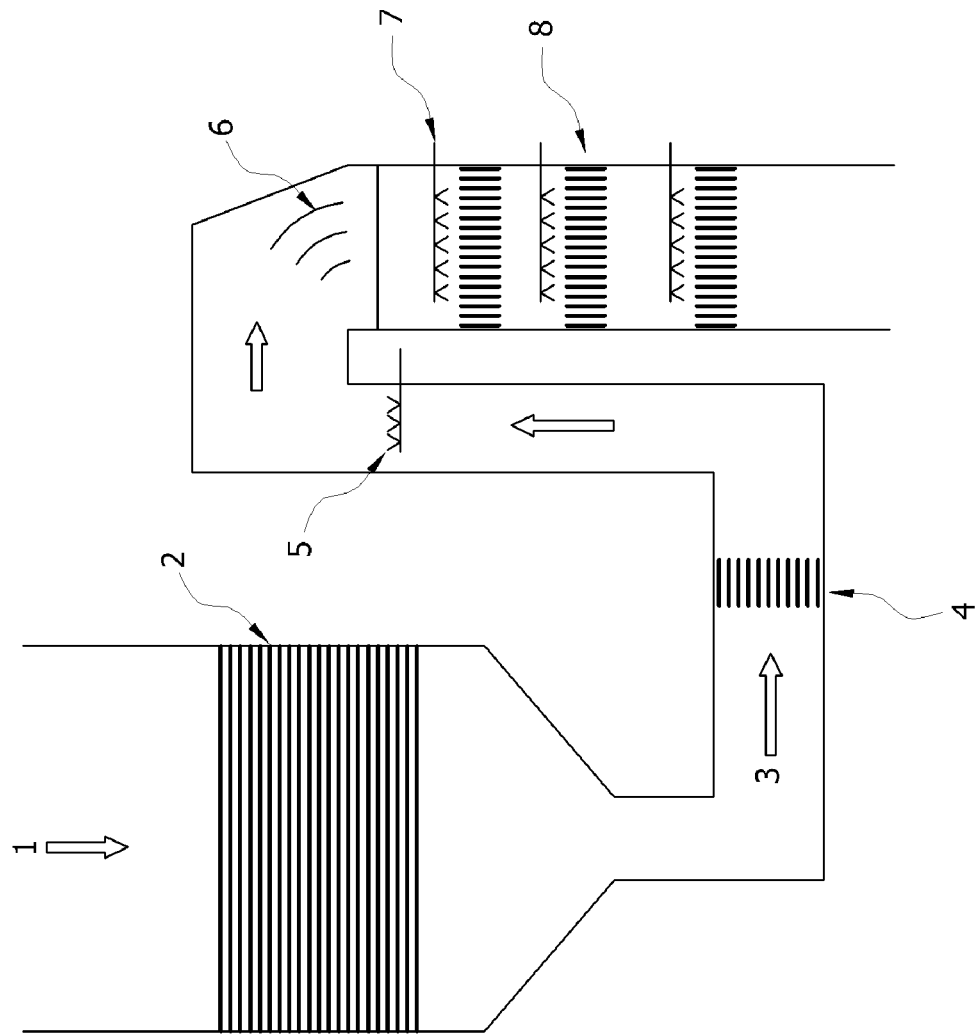
FIG. 1 shows a non-thermal plasma or ozone generator installed in an exhaust gas passageway of a boiler.

FIG. 1 shows a system for inducing fast de-$NO_x$ reaction by oxidizing NO included in exhaust gas to $NO_2$ at 150-200° C. using a non-thermal plasma or ozone generator. Use of the non-thermal plasma or ozone generator allows easy inducement of fast de-$NO_x$ reaction of exhaust gas at low temperature of 200° C. or below through easy control of $NO:NO_2$ ratio. But, this system is preferred when general SCR is inapplicable because the operation of the non-thermal plasma or ozone generator requires a lot of power consumption.

Figure 2:
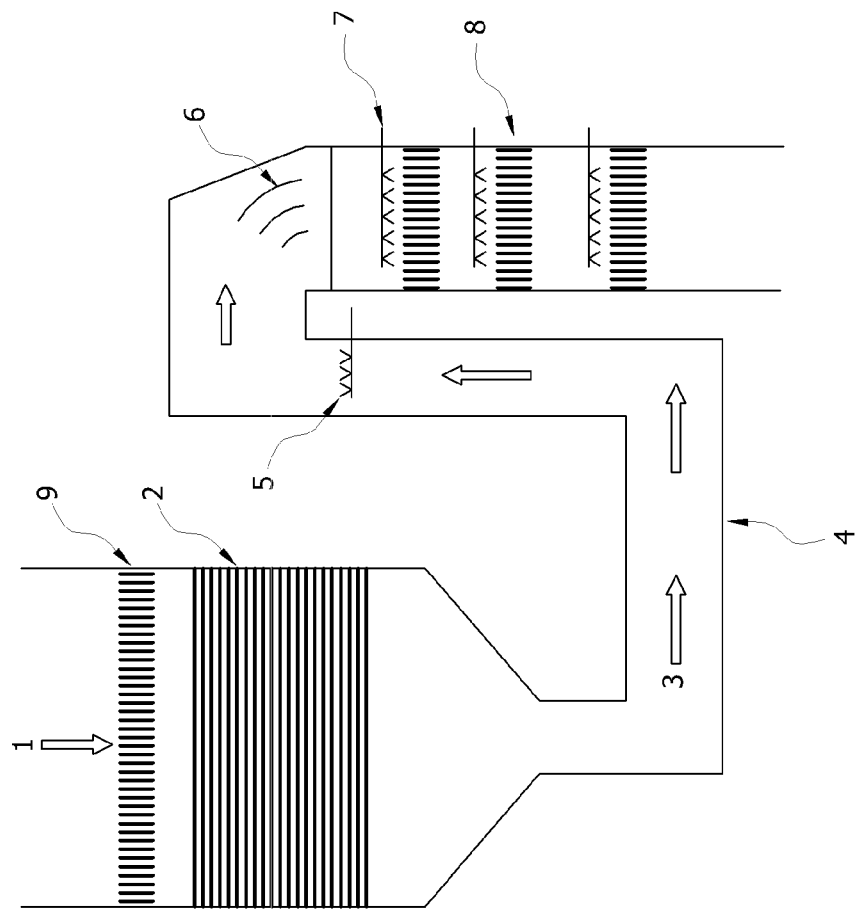
FIG. 2 shows an oxidation catalyst and a selective catalytic reduction (SCR) device installed in a boiler.

Although noble metal-based oxidation catalyst may be used for oxidation of NO instead of the non-thermal plasma or ozone generator, the catalyst is expensive and its oxidation catalyst is greatly reduced at 150-200° C. where selective catalytic reduction (SCR) proceeds effectively. Although economic feasibility was improved with the recent development of $FeMnO_x/TiO_2$-based metal catalyst, catalytic performance at 150-200° C. where fast SCR proceeds effectively is not so good. Accordingly, the oxidation catalyst cannot be installed as in FIG. 1 but has to be disposed as in FIG. 2 such that the reaction can occur at 300° C. or above.

Figure 3:
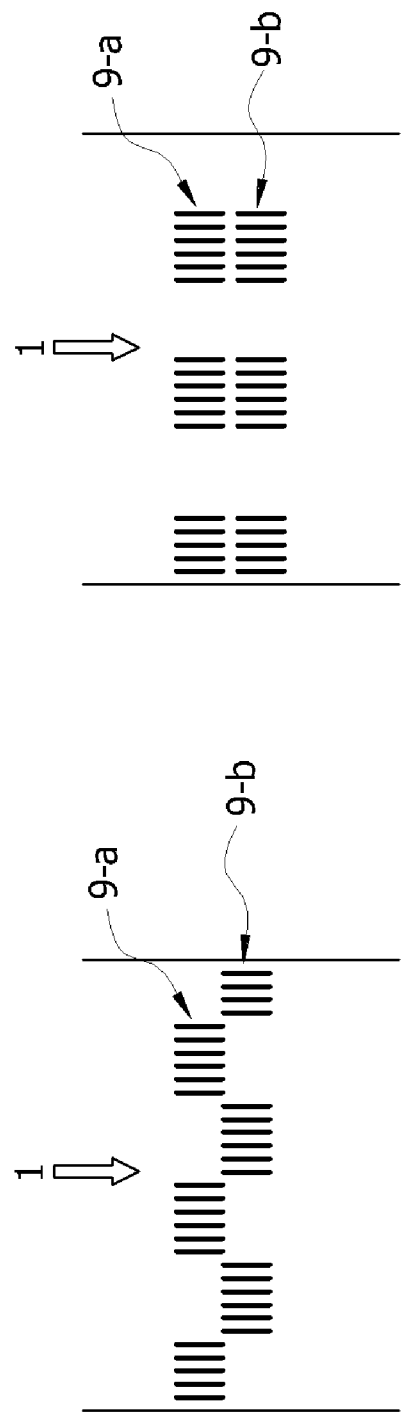
FIG. 3 shows an oxidation catalyst installed by combining a fixed oxidation catalyst and a moveable oxidation catalyst to adjust the degree of NO oxidation.

In order to solve the problem of the oxidation catalyst of difficulty in control of the degree of NO oxidation, a fixed oxidation catalyst and a moveable oxidation catalyst are provided as shown in FIG. 3. If high degree of oxidation is desired, the fixed and moveable oxidation catalysts are disposed in tandem as in FIG. 3-a. And, if the degree of oxidation needs to be decreased, the moveable oxidation catalyst may be positioned in the rear of the fixed oxidation catalyst as in FIG. 3-b. In this way, the $NO:NO_2$ ratio can be controlled easily.

Figure 4:
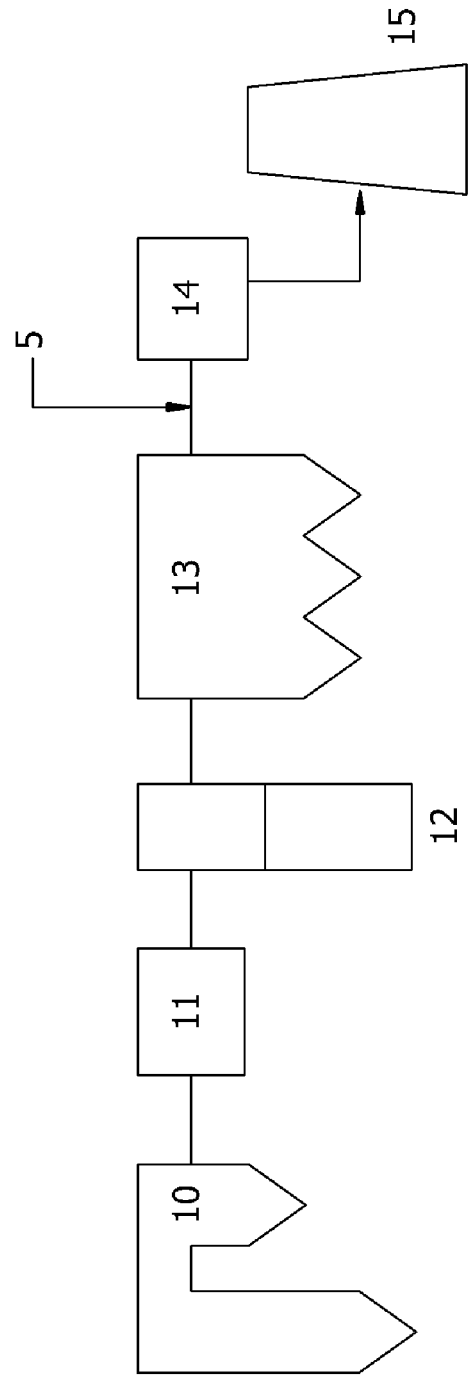
FIG. 4 shows an oxidation catalyst and an SCR device installed in a glass melting furnace or a biomass boiler.
Figure 5:
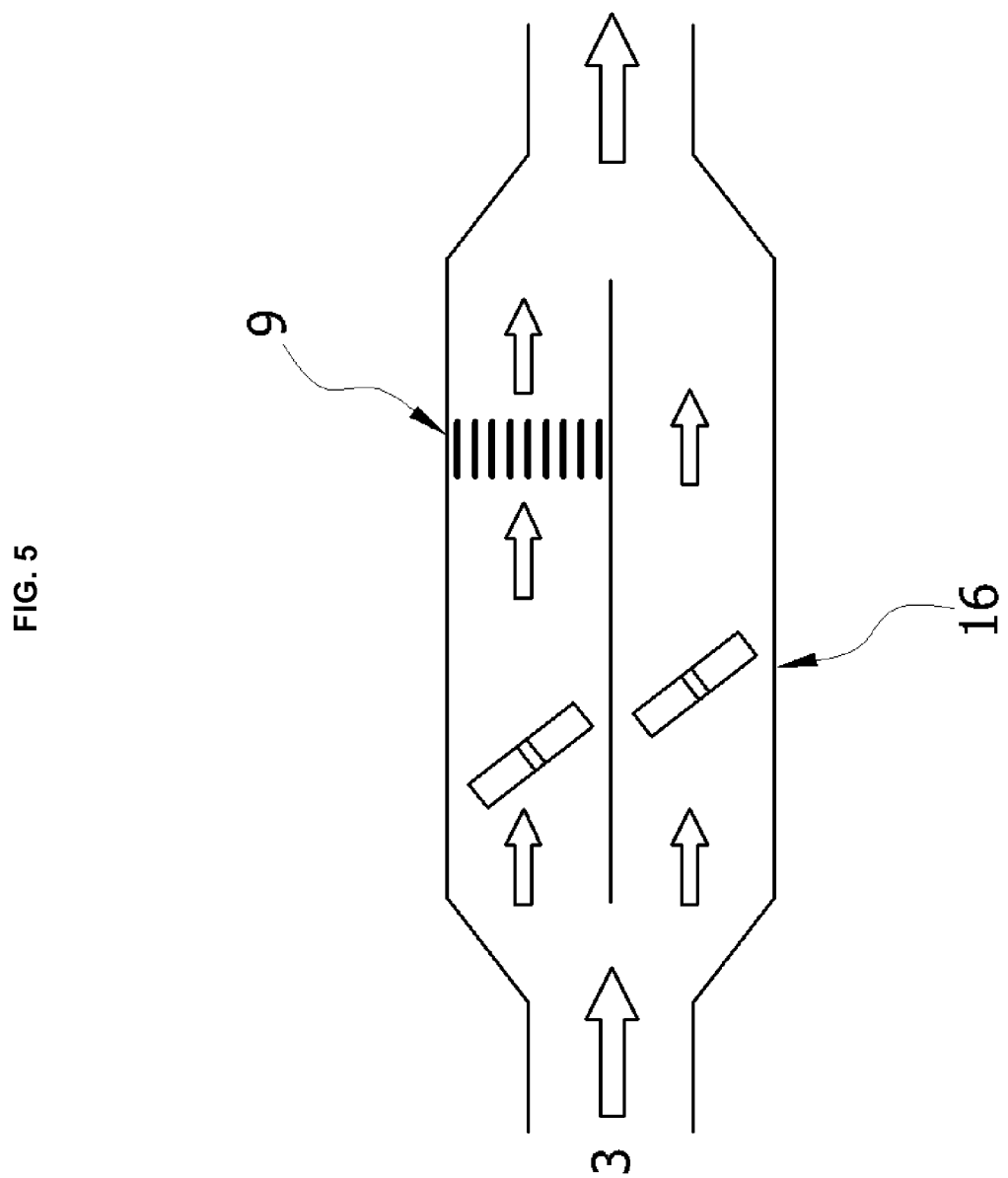
FIG. 5 shows the oxidation catalyst of FIG. 4 installed together with a flow divider.

In case of a glass melting furnace, since the SCR device is installed in the rear of a dust collector, the oxidation catalyst may be installed in front of a heat exchanger at high temperature as shown in FIG. 4 so as to adjust the composition of the exhaust gas and fast SCR reaction may be induced at the SCR device installed in the rear of the dust collector. In order to solve the problem of the oxidation catalyst of difficulty in control of the degree of NO oxidation, the oxidation catalyst of FIG. 4 may be installed as in FIG. 5. In this case, the $NO:NO_2$ ratio can be controlled easily by controlling the flow of the exhaust gas.

Figure 6:
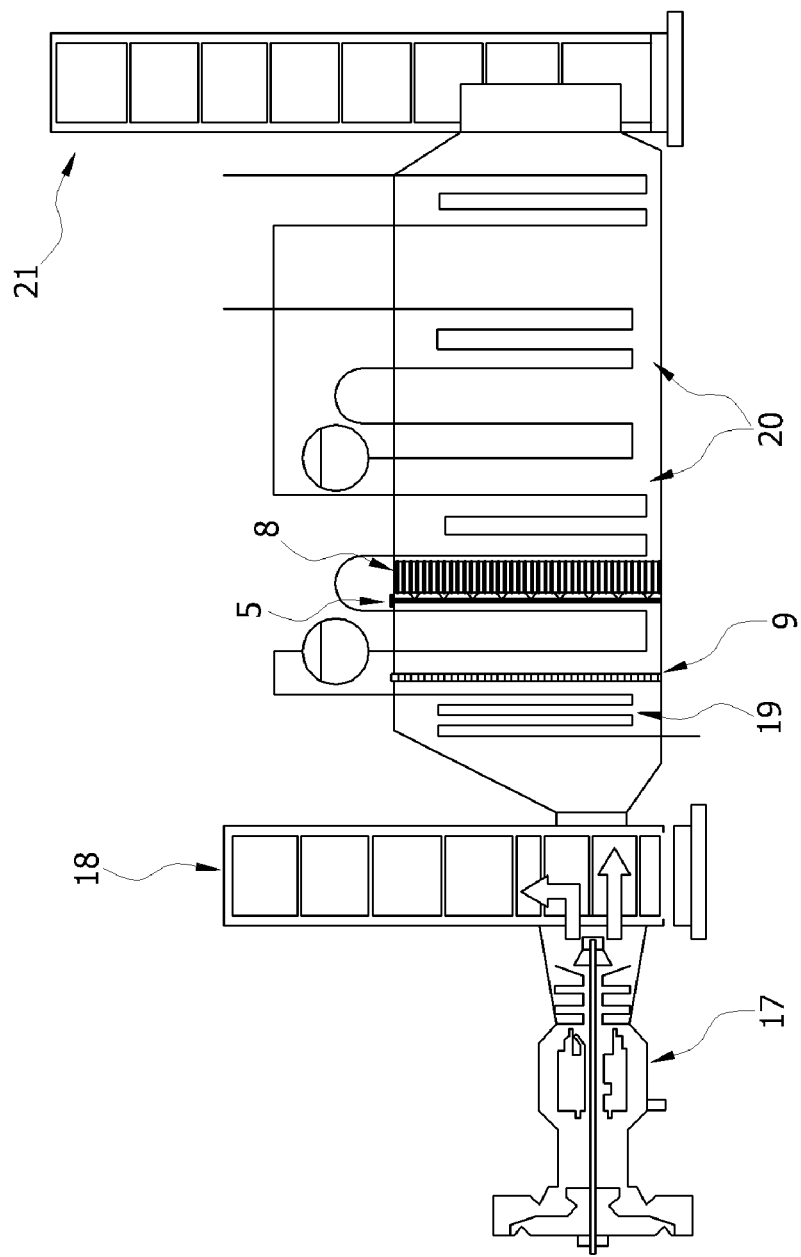
FIG. 6 shows an oxidation catalyst and an SCR installed in a heat recovery steam generator in the rear of a gas turbine.

In case of combined cycle power generation, since it is relatively easy to ensure an optimum temperature zone, the oxidation catalyst may be installed in the high-temperature zone in the rear of a gas turbine inside a heat recovery steam generator, as shown in FIG. 6.

Figure 7:
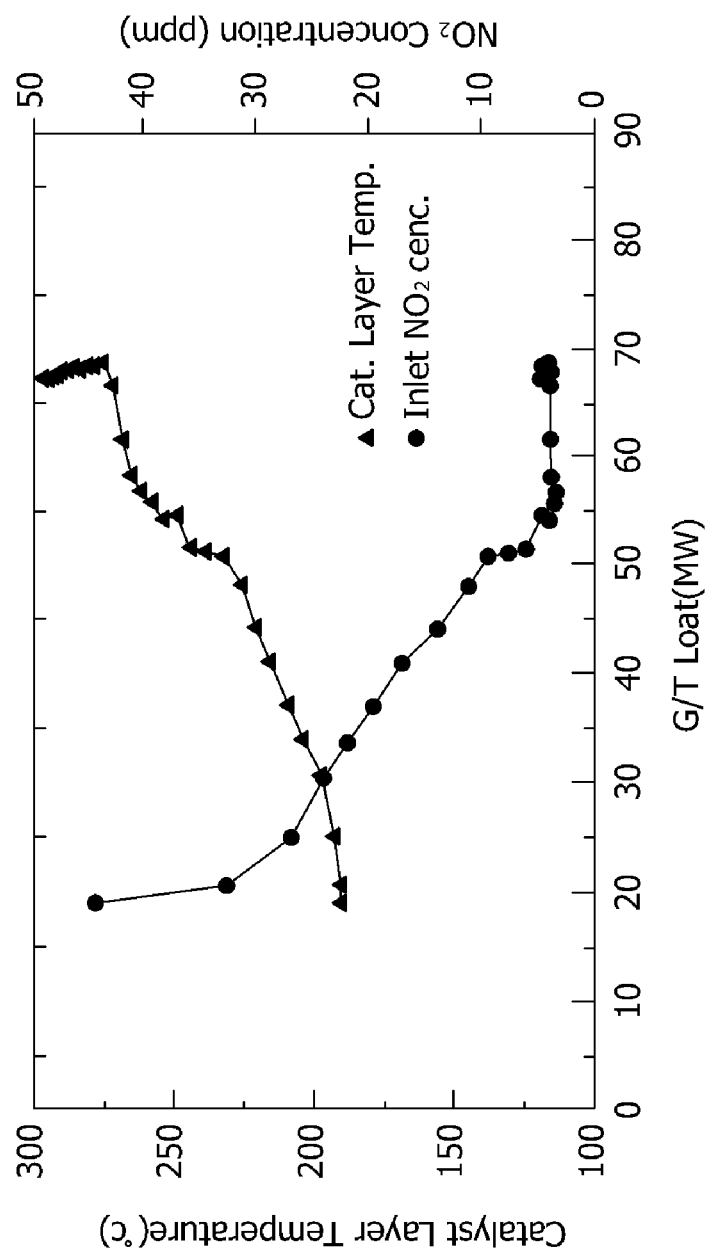
FIG. 7 shows change in $NO_2$ concentration and exhaust gas temperature depending on gas turbine output in the rear of a superheater of a heat recovery steam generator in the rear of a gas turbine.
Figure 8:
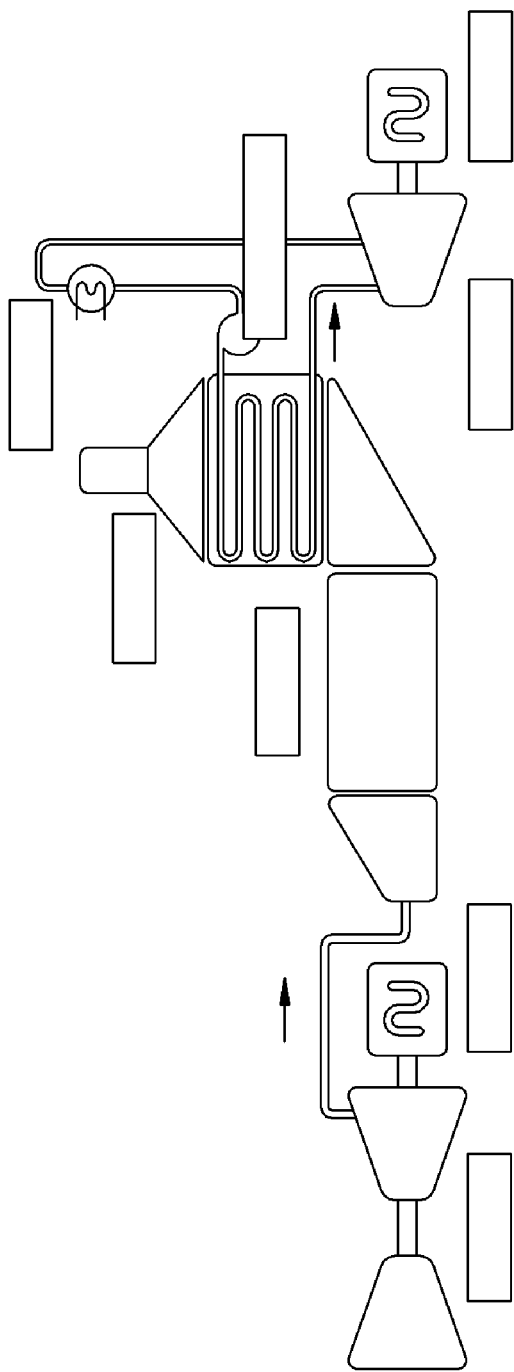
FIG. 8 shows a method for raising the temperature of exhaust gas at the inlet of a heat recovery steam generator by installing a duct burner in the rear of a gas turbine.

FIG. 7 shows change in $NO_2$ concentration and exhaust gas temperature with time during initial startup of a combined cycle power plant where yellow plume is produced owing to the generation of $NO_2$ in large quantity. The yellow plume may not be easily removed if $NO_2$ concentration is high because the SCR reaction proceeds slowly.

Figure 9:
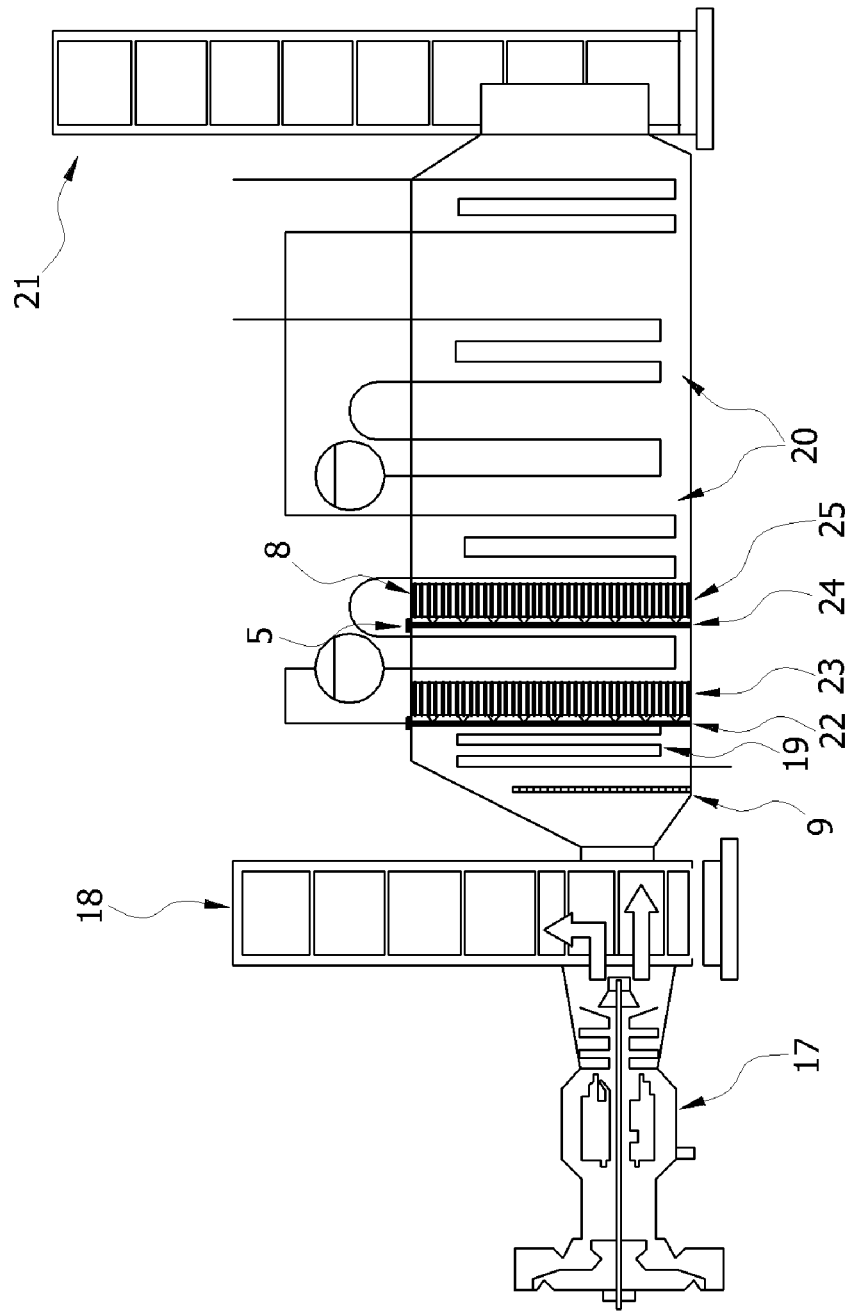
FIG. 9 shows a system for removing yellow plume produced during startup of a gas turbine and nitrogen oxide produced during normal operation wherein a catalyst is installed in two stages, with the first-stage catalyst for reducing $NO_2$ and the second-stage catalyst for removing $NO_x$.

In this case, as shown in FIG. 9, the de-$NO_x$ catalyst may be disposed in two stages and a hydrocarbon reducing agent such as $C_3H_6$ may be sprayed in front of the first-stage catalyst to reduce an adequate amount of $NO_2$ to NO. It is known that, if the hydrocarbon such as $C_3H_6$ is sprayed as a reducing agent instead of the ammonia-based SCR catalyst, $NO_2$ is reduced to NO, $N_2O$ and $N_2$ and the hydrocarbon such as $C_3H_6$ is oxidized to CO. The spraying amount of the $C_3H_6$ reducing agent may be adjusted such that the ratio of $NO:NO_2$ in the rear of the first-stage catalyst is 1:1. And, a reducing agent such as ammonia may be sprayed in front of the second-stage catalyst so as to induce fast SCR reaction and thereby remove not only the nitrogen oxide included in the exhaust gas but also the yellow plume produced during startup of the gas turbine.

After the operation of the gas turbine is stabilized, the spraying of the hydrocarbon reducing agent in front of the first-stage catalyst may be stopped and a reducing agent such as ammonia or urea may be sprayed.

MODE FOR INVENTION

Example

Fast selective catalytic reduction (SCR) was carried out under the following condition.

De-$NO_x$ efficiency was measured under the condition of $NH_3/NO_x=1.0$, $O_2=3\%$, $H_2O=6\%$, $SV=60,000$ $hr^{-1}$ and temperature=180-300° C., with $NO_x$ concentration fixed at 300 ppm and $NO_2/NO_x$ ratios of 0.1, 0.2, 0.3 and 0.4.

TABLE 1

| $NO_2/NO_x$ | NO (ppm) | $NO_2$ (ppm) | $NO_x$ (ppm) |
|---|---|---|---|
| 0.1 | 270 | 30 | 300 |
| 0.2 | 236 | 64 | 300 |
| 0.3 | 212 | 88 | 300 |
| 0.4 | 174 | 126 | 300 |

Figure 10:
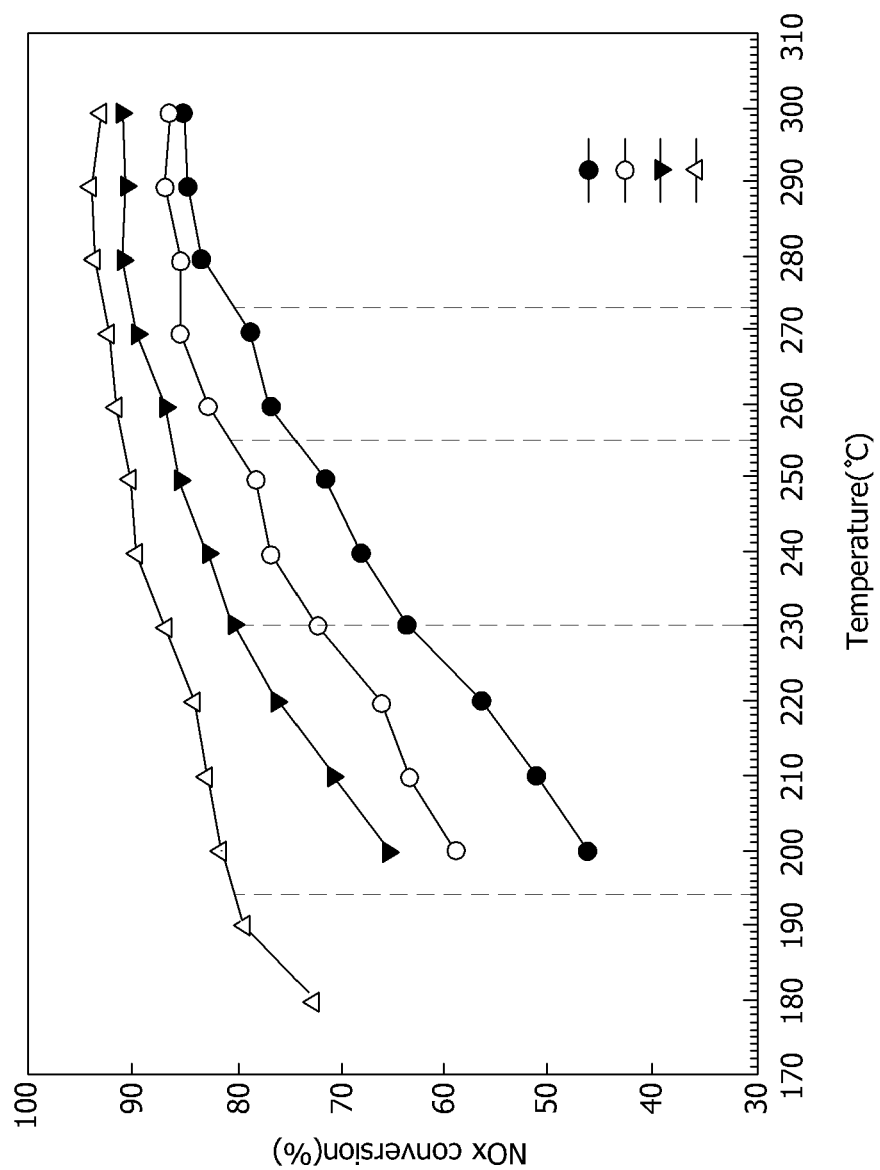
FIG. 10 shows a result of analyzing the relationship between $NO_2/NO_x$ ratio and de-$NO_x$ efficiency depending on temperature.
Figure 11:
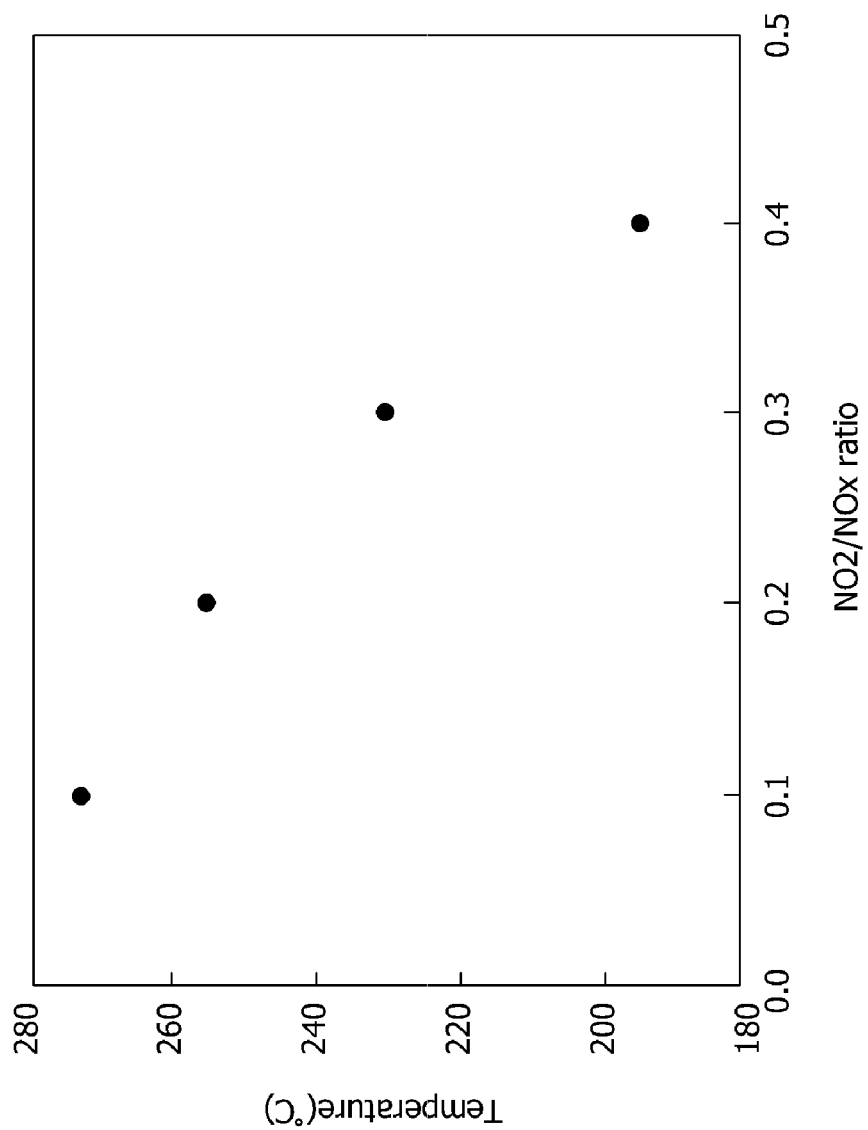
FIG. 11 shows a relationship between $NO_2/NO_x$ ratio and temperature when de-$NO_x$ efficiency is 80%.

As seen from FIG. 10, the de-$NO_x$ efficiency increased with the $NO_2/NO_x$ ratio. FIG. 11 shows a relationship between the $NO_2/NO_x$ ratio and temperature when de-$NO_x$ efficiency is 80%. The reaction temperature could be lowered by as much as 80° C., from 273° C. when $NO_2/NO_x=0.1$ to 194° C. when $NO_2/NO_x=0.4$.

The invention claimed is:

1. A method for increasing de-$NO_x$ efficiency of exhaust gas and removing yellow plume at 300° C. or below, comprising:
    providing a fixed oxidation catalyst and a moveable oxidation catalyst; and
    adjusting the $NO_2:NO_x$ ratio of exhaust gas to 0.5 by moving the moveable oxidation catalyst so as to achieve fast selective catalytic reduction (SCR).
2. The method according to claim 1, which further comprises installing a catalyst oxidizing NO to $NO_2$ in front of an economizer of a boiler.

3. The method according to claim 1, which further comprises:
  installing a catalyst oxidizing NO to $NO_2$ between a boiler and a heat exchanger; and
  separating an exhaust gas duct into two, installing an oxidation catalyst in one of the two ducts and controlling the flow of the exhaust gas using a damper so as to control the degree of oxidation of $NO_2$.

4. The method according to claim 1, which further comprises installing a catalyst oxidizing NO to $NO_2$ between a gas turbine and a de-$NO_x$ catalyst of a heat recovery steam generator.

5. The method according to claim 1, which further comprises conducting startup by separating a de-$NO_x$ catalyst into two stages in order to reduce $NO_2$ produced in excess during the startup of a boiler or a gas turbine to NO, wherein hydrocarbon is sprayed instead of ammonia to the first-stage de-$NO_x$ catalyst so as to reduce an adequate amount of $NO_2$ to NO and fast de-$NO_x$ reaction of the exhaust gas is induced at the second-stage de-$NO_x$ catalyst so as to remove yellow plume and nitrogen oxide.

\* \* \* \* \*